US007747531B2

(12) United States Patent
Cronce

(10) Patent No.: US 7,747,531 B2
(45) Date of Patent: Jun. 29, 2010

(54) METHOD AND SYSTEM FOR DELIVERY OF SECURE SOFTWARE LICENSE INFORMATION

(75) Inventor: Paul A. Cronce, San Jose, CA (US)

(73) Assignee: Pace Anti-Piracy, San Jose, CA (US)

( * ) Notice: Subject to any disclaimer, the term of this patent is extended or adjusted under 35 U.S.C. 154(b) by 2235 days.

(21) Appl. No.: 10/072,597

(22) Filed: Feb. 5, 2002

(65) Prior Publication Data

US 2003/0149670 A1 Aug. 7, 2003

(51) Int. Cl.
*G06Q 99/00* (2006.01)
(52) U.S. Cl. ........................................ 705/59
(58) Field of Classification Search ............ 705/51, 705/59; 713/156
See application file for complete search history.

(56) References Cited

U.S. PATENT DOCUMENTS 5,864,620 A 1/1999 Pettitt
6,611,812 B2 * 8/2003 Hurtado et al. ............... 705/26
6,898,706 B1 * 5/2005 Venkatesan et al. ......... 713/167
6,904,523 B2 * 6/2005 Bialick et al. ............... 713/156

* cited by examiner

*Primary Examiner*—Andrew J. Fischer
*Assistant Examiner*—Jacob C. Coppola
(74) *Attorney, Agent, or Firm*—Virtual Law Partners LLP

(57) ABSTRACT

A system and method for delivery of secure software license information to authorize the use of a software program is disclosed. The method and system comprises a computer system for executing the software program and the authorizing program, and a license server, connected to the computer system over a network. The method and system include associating a publisher certificate and a signed product key pair with the program to be authorized, generating a license request containing user and product information and signed by the private key from the product key pair, transmitting the license request to a license server, generating a license using data extracted from the license request and license terms, signing the license with the publisher private key associated with the publisher certificate, transmitting the license to the authorization program, validating the license using the publisher certificate, and using the license terms to control the use of the software program.

26 Claims, 10 Drawing Sheets

METHOD AND SYSTEM FOR DELIVERY OF SECURE SOFTWARE LICENSE INFORMATION

CROSS-REFERENCE TO RELATED APPLICATIONS

The present invention is related to application U.S. Ser. No. 10/080,639, entitled "Delivery Of A Secure Software License For a Software Product And A Toolset For Creating The Software Product" filed on Feb. 21, 2002, and assigned to the assignee of the present invention.

FIELD OF THE INVENTION

The present invention relates to licensing of software, and more particularly to the delivery of secure software license information for the purpose of controlling licensed software usage.

BACKGROUND OF THE INVENTION

Software licensing has been used for some time in the software industry as a means of controlling use of software, and more particularly, for the purpose of limiting or eliminating unauthorized use of software, known as software piracy.

The resulting economic dislocation that occurs due to software piracy is severe. As the cost of developing and supporting software programs increases, the need to reduce piracy grows. One of the key elements of reducing software piracy is through the use of an electronic software license, delivered to the authorized user to enable the software program to operate. The electronic license includes the required information in a form that is understood by the software program, and contains license terms.

License terms are the terms that apply to the use of the particular copy of the software program, and can include a start date, an end date, a number of program launches, fingerprint information to limit use on a specific local area network or on a specific machine, and other controlling information. For increased security, the electronic software license may be encrypted to hamper hacker efforts to bypass its function. This requires that the software program contain a decryption key to decrypt the license before extracting the information required.

Since the runtime environment for the software program and its authorizing code is typically unprotected, such as with Microsoft Corporation's Windows Operating System, and a large number of programmers have extensive knowledge of programming on such a system, it is difficult to effectively protect software running on such machines. All one can do is increase the difficulty of bypassing the electronic license functionality, but without significant inconvenience to the user or to the software developer, the reseller, or to technical support for the software program.

Previous efforts to authenticate a software license have used techniques such as "challenge/response" to deliver the required information to the electronic license on the user's machine. These often have been encoded in a series of alphanumeric characters to make it easy to deliver the challenge and receive the response, such as by phone, or by email, where direct web delivery is not practical. This method requires the user to copy and paste, type, or read the challenge, depending on the communication means used to delivery the challenge, and likewise to copy and paste (or type in) the response. For very small responses, this is not too difficult. However, as the required content of the response increases with increasing complexity, this becomes unwieldy and inconvenient for the user. One of the increases in complexity comes from the use of digital signatures, which are desired to improve security.

An important factor in delivery of a solution to these problems is a toolset that can be used by the software product developer/publisher to convert his software product into a "license-managed" product with minimum effort and complexity. Even with the best tools, however, a problem remains. If a successful hack is created to bypass the license terms, such that copies of the software product can be freely (but illegally) distributed, there is often no way to determine the origin of the software hack.

Accordingly, what is needed is a system and method for delivery of secure license information that is extensible and easy to use. The present invention addresses such a need. Finally, there should be a security link in the provided solution that allows the source of a hack to be traced back to the original purchaser, to assist in the effort to stop the illegal activities. The present invention addresses all of these needs.

SUMMARY OF THE INVENTION

The present invention provides a method and system for the delivery of secure software license information to authorize the use of a software product, such as a software program or software resource. The system comprises a computer system for using the software product, an authorizing program, and a license server, connected to the computer system over a network; the method and system include associating a publisher certificate and a product certificate and private key with the software product to be authorized, generating a license request containing user and product information signed by the private product key, transmitting the license request to a license server, generating a license with license terms using data extracted from the license request, signing the license with the publisher private key associated with the publisher certificate, transmitting the license to the authorization program, validating the license using the publisher certificate, and using the license terms to control the use of the software product.

According to the system and method disclosed herein, the present invention provides a flexible and extensible system and method for delivering license terms to software program users that is easy to use and not prone to user errors. In addition, the present invention addresses and the need for ensuring a secure identity link to the purchaser of the software product.

DETAILED DESCRIPTION

The present invention relates to a method and system for delivering secure license information to authorize use of a software product. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
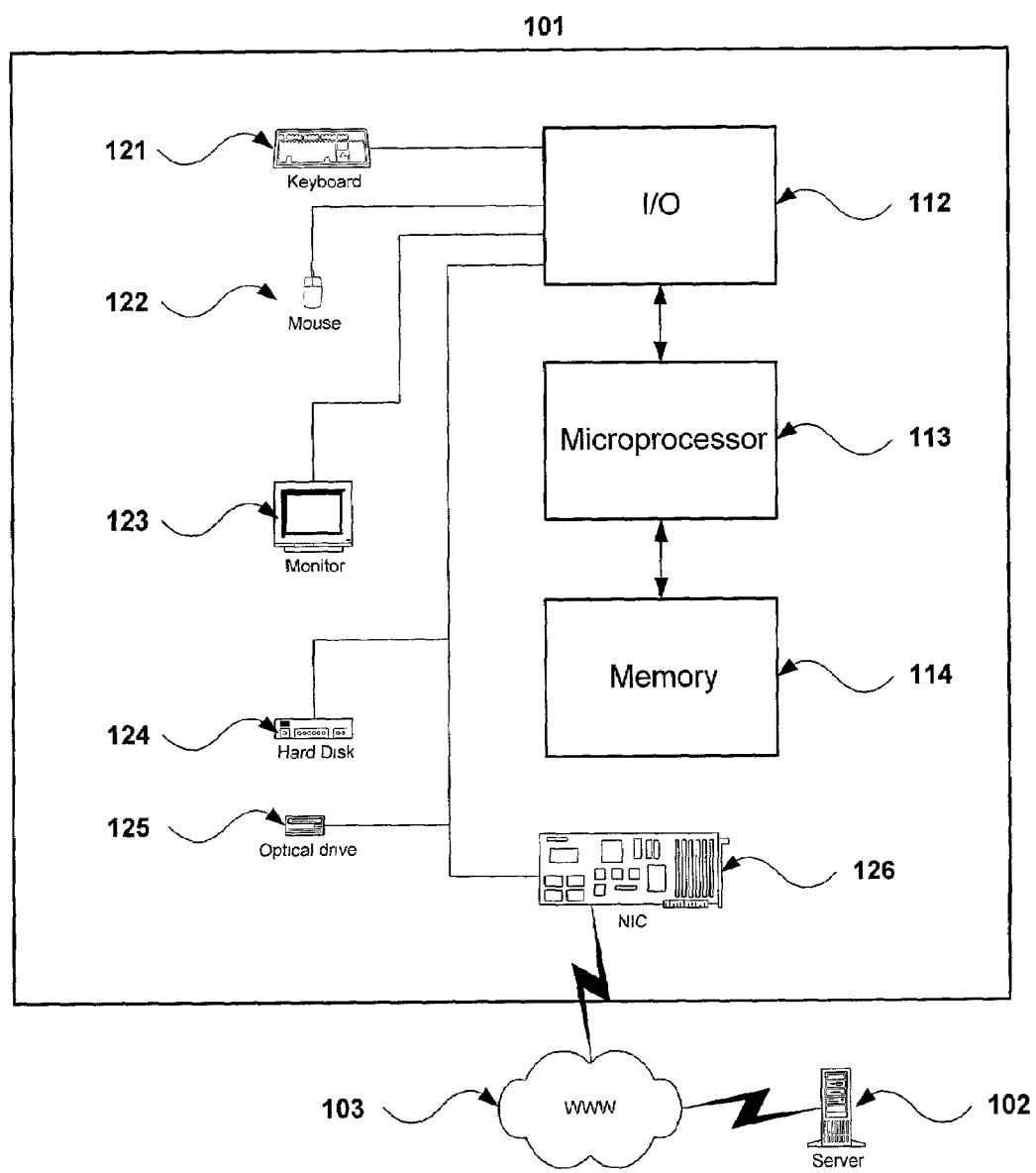
FIG. 1 is a block diagram of the system of the present invention comprising a computer system and server connected via a network connection

Referring to FIG. 1, a block diagram of the operating environment of the present invention is shown that includes a conventional computer system 101 and server 102 connected via a network connection 103. The computer system 101 comprises a microprocessor or CPU 113, memory 114, and I/O circuitry 112. The I/O circuitry 112 is typically connected to various subsystems, such as a keyboard 121, a mouse 122, a monitor 123, one or more hard disk drives 124, an optical drive 125 such as a CD-ROM, CD-R/W, or DVD drive, and one or more interface cards, such as NIC (Network Interface Card) 126. Many variations of a computer system 101 capable of supporting the operation of the present invention are well known to those with ordinary skill in the art, and thus will not be described herein.

The network card 126 or its equivalent connects the computer system 101 to a network 103. Also connected to the network 103 is a back-end server 102. The network can comprise the worldwide web, as shown in FIG. 1, or can be a local area network (LAN) or wide area network (WAN) of a different sort. Network access may be wireless or wired. A back-end server, referred to as license server 102 and preferably controlled by a key authority, provides the functionality of creating software licenses as described herein. Alternate embodiments for the back-end server configuration include a computer system used by an operator, where manual intervention is required.

Figure 2:
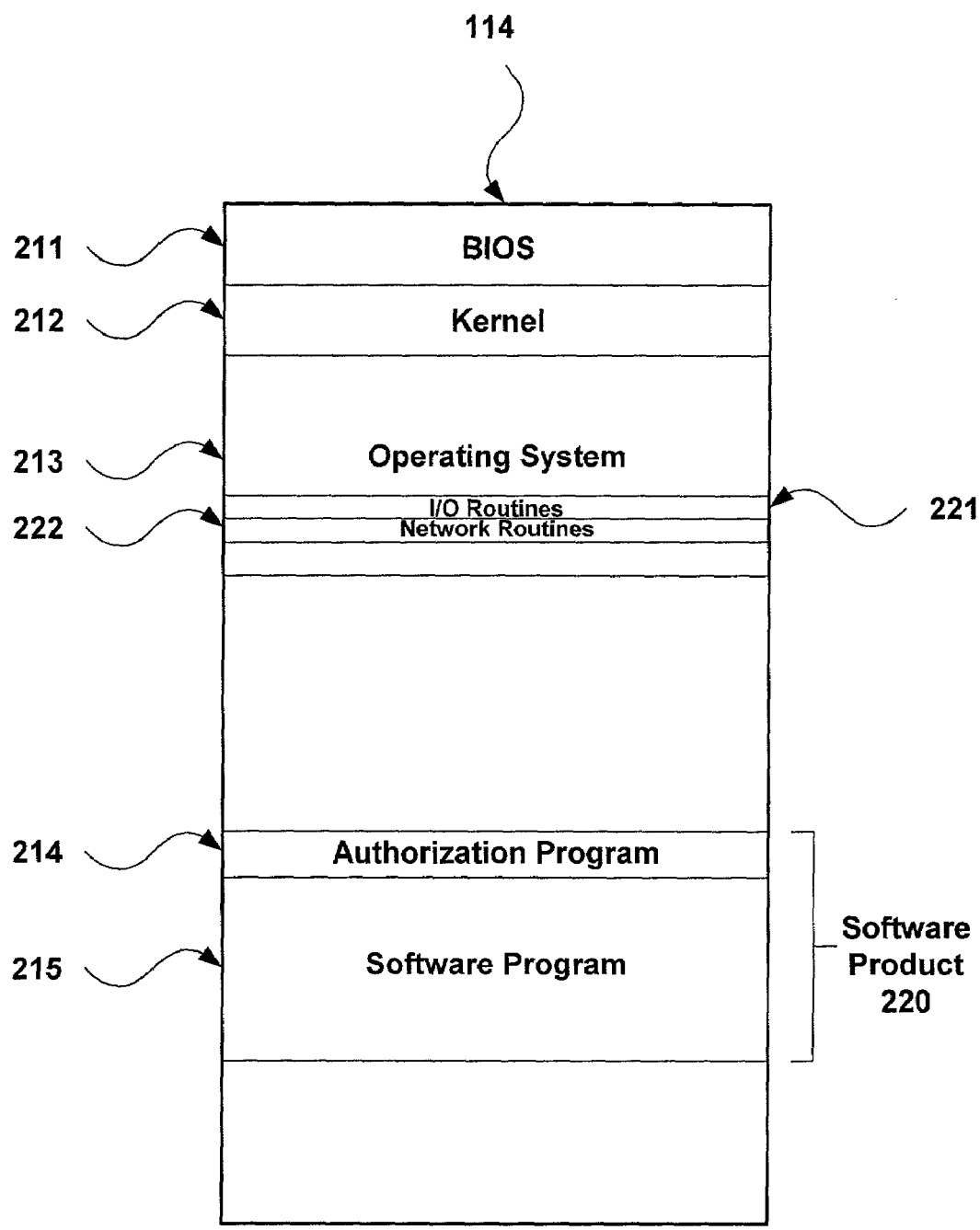
FIG. 2 is a block diagram of the software on the computer system to implement the present invention.

Referring now to FIG. 2, a block diagram of the software on the computer system 101 to implement the present invention is shown. FIG. 2 shows a typical configuration of the software product 220 loaded into memory 114 of computer system 101. The operating software of the computer system 101 comprises the BIOS 211, the Kernel 212, the Operating System 213, and included with the Operating System 213 are I/O Routines 221 and Network Routines 222. The Network Routines 222 in conjunction with the I/O Routines 221 are used to enable the functionality of the NIC 126 for communicating over a network 103. The function of these software components is well known by those of ordinary skill in the art, and thus will not be discussed in detail herein.

A user loads a software product 220 on the computer 101, the license for which is distributed and managed as disclosed herein. The software product 220 includes an authorization program 214 and a software product 215. The software product 215 provides the desired functionality of interest to the user, or a resource of interest to the user, such as a piece of clip art, a music clip, or a font. The authorization program 214 is responsible for requesting a license for the software product 215 from the license server 102, validating the license, and for managing the use of software product 215 according to the license terms within the license, described below.

The software product 215 and its associated authorization program 214 is loaded into memory 114 when the user invokes the software product 220 using the user interface of the computer system 101. By design, the authorization program 214 runs first, and, depending on the presence of a valid license, will control the operation of the software product 215 appropriately.

In accordance with a preferred embodiment, a publisher certificate and a product certificate are associated with the software product 215 to be authorized, where both the publisher certificate and the product certificate include respective private/public key pairs, and where at least one of the product certificate private and public keys is digitally signed by the publisher private key associated with the publisher certificate. In a further embodiment, the publisher certificate is digitally signed by a certificate authority.

Figure 3:
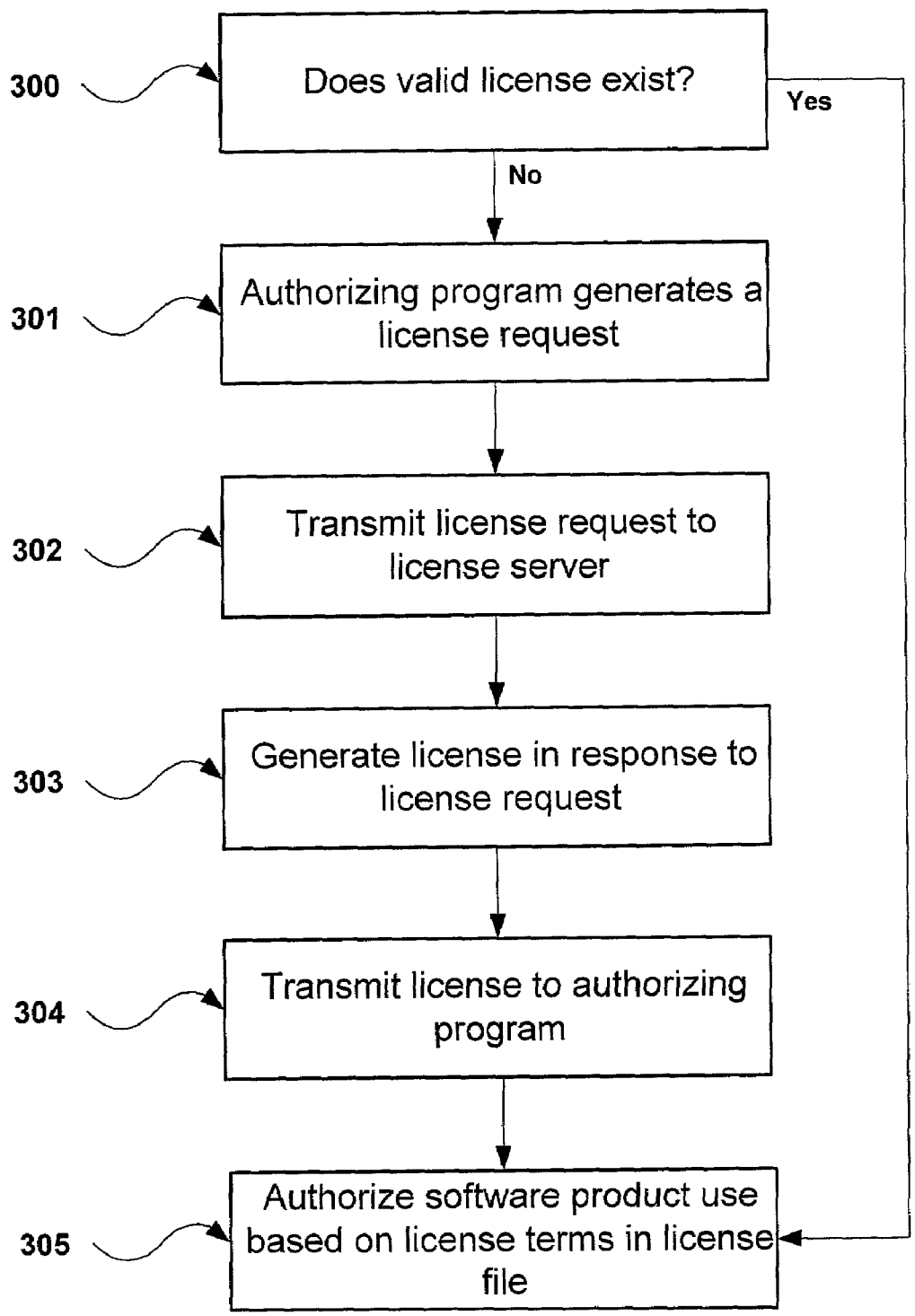
FIG. 3 is a flow diagram for the process of delivering secure license information to a software program.

Referring now to FIG. 3, a flow diagram for the process of delivering secure license information to a software product 215 is shown. The process begins with step 300, where the authorization program 214 checks to see if a valid license exists. If one does exist, the process continues with step 305. If no license is found, the authorizing program 214 generates a license request in step 301. This process is described below in detail in association with FIG. 6. This license request in the preferred embodiment is in the form of a signed XML document, and will be described in detail below in association with FIG. 7.

In a preferred embodiment, the license request in the form of an XML document is signed using the product private key. An alternate embodiment is to encrypt the license request using a product public key, rather than signing the license. In this case, the product private key is not included within the authorizing program 214, since the trust relationship described below established by the use of certificates is not in effect. In this embodiment, security is established by maintaining the privacy of the private keys.

Next, in step 302, the license request is transferred to the license server 102. The path to the license server 102 is through the network 103 connecting the computer system 101 and the license server 102. However, as those of ordinary skill in the art are aware, more complex arrangements are possible, with multiple network layers as well as multiple server layers. All are within the scope of the present invention. Also, the invention does not require that the license request be transmitted over a network, but only that the license request be delivered to the license server. This can include use of email, a floppy disk, wireless communications, or even a printed page, for example. The license request is preferably in the form of a document, and thus any method of document delivery is within the scope of the invention.

In step 303, the license request is received by the license server 102, and processed into a suitable license for the software product 215. This process is described below in association with FIG. 8. In one alternate embodiment, where the license request was encrypted with the product public key rather than signed, the license request must be decrypted with the product private key prior to processing. In this same alternate embodiment, the license response is encrypted using the publisher's private key before being transferred back to the authorizing program.

Next, in step 304, the license generated in response to the license request is transferred back to the authorizing program

214. This transfer can also utilize all of the mechanisms suggested for step 302 above. In order to preserve ease of use, however, the delivery is preferably in electronic form rather than paper. Otherwise, the effort required by the user to enter the license by typing would be excessive and not acceptable.

In the preferred embodiment shown in FIG. 1, the transmission of the license request and license in steps 302 and 304 respectively are done automatically using an existing network connection 103. Thus, there is very little delay in the process of enabling the use of the software product 215 once loaded onto computer system 101. It is critical for acceptance of any licensing system that it is as simple, fast, and as streamlined and automatic as possible. A network connection 103 to the license server 102 achieves these goals. Of course there are many other situations, including technical support situations, or where no network connection exists, where other methods are preferred and can be used according to the present invention.

Finally, in step 305, the authorization program 214 validates the license in detail and uses the contained license terms and other information within the license to control the use of the software product 215. The process of validating the license is described below in association with FIG. 10. The licensed control of use of software product 215 is by various license terms, such as license start and end dates, number of program launches, features allowed and disallowed, etc. One of the limitations can even be as restrictive as only allowing the software product 215 to run on a specific machine. Various methods of limiting or controlling use of the software product 215 have been used. License terms and license management methods are well known to one of ordinary skill in the art, and will not be covered in detail herein.

In an alternate embodiment, where the license response has been encrypted rather than signed, the validation is in the form of successfully decrypting the license using the publisher's public key. The use of two separate key sets, one for license requests and a separate one for license responses increases the security of the system.

One of the underlying technologies used extensively in the present invention is a digital certificate and a digital signature. The digital certificate and signature are components of a trust-based system incorporating a certificate authority (CA) and the use of public/private encryption keys and message digest algorithms. The public/private encryption keys allow secure communications and delivery of tamperproof documents. The private key is used to encrypt, and the public key is used to decrypt, or vise versa. The public and private keys are mathematically related, but one cannot be derived from the other. Thus, if you encrypt with the public key—typically widely available—only the owner of the private key can decrypt. Alternatively, if the private key owner encrypts with his private key, anyone with his public key can decrypt, with the knowledge that the private key owner is the originator of the encrypted data. It is critical for security that the private keys remain private and in the control of the key owner.

An entity that has access to a private key is referred to as a key authority. Thus, the key owner is a key authority for his key set. In addition, the private key owner may provide his private key to another entity for the purpose of handling transactions. In this case, the other entity is a key authority for the owner's key set as well.

Digital signatures are created using message digest algorithms. A message digest algorithm is used to generate a unique number, known as the message digest, from any document. The likelihood of any two documents having the same message digest is extremely small, and thus can be considered to be completely unique for practical application. The original message cannot be recovered using the message digest. A common message digest algorithm is the MD5 algorithm from RSA.

The use of digital signatures has become standard for identifying the originators of information. A digital signature comprises a digest of the message that is signed, i.e., encrypted using the private key of the originator. Verification of the accuracy of the message and the identity of the originator is accomplished by decrypting the message digest, computing a digest on the message, and comparing the two message digests. If they are the same, the message is intact, and the identity of the signer can be determined as the owner of the private key associated with the public key used to decrypt.

The digital certificate is used to verify the identity of the owner of a public key. The certificate is created by the owner sending the public key to a certificate authority, as a request for a digital certificate. The certificate authority investigates the owner to ensure correct identity information is associated with the certificate. Once the owner's identity has been verified, the certificate authority issues a certificate. This certificate is essentially the owner's public key and identification, plus the certificate authority identification, all signed by the certificate authority private key, and thus verifiable using the certificate authority public key. It is the trust in the certificate authority and their identity verification, plus the signing by the certificate authority private key that validates the certificate, and thus the identity of the signer on a digital document.

Figure 4:
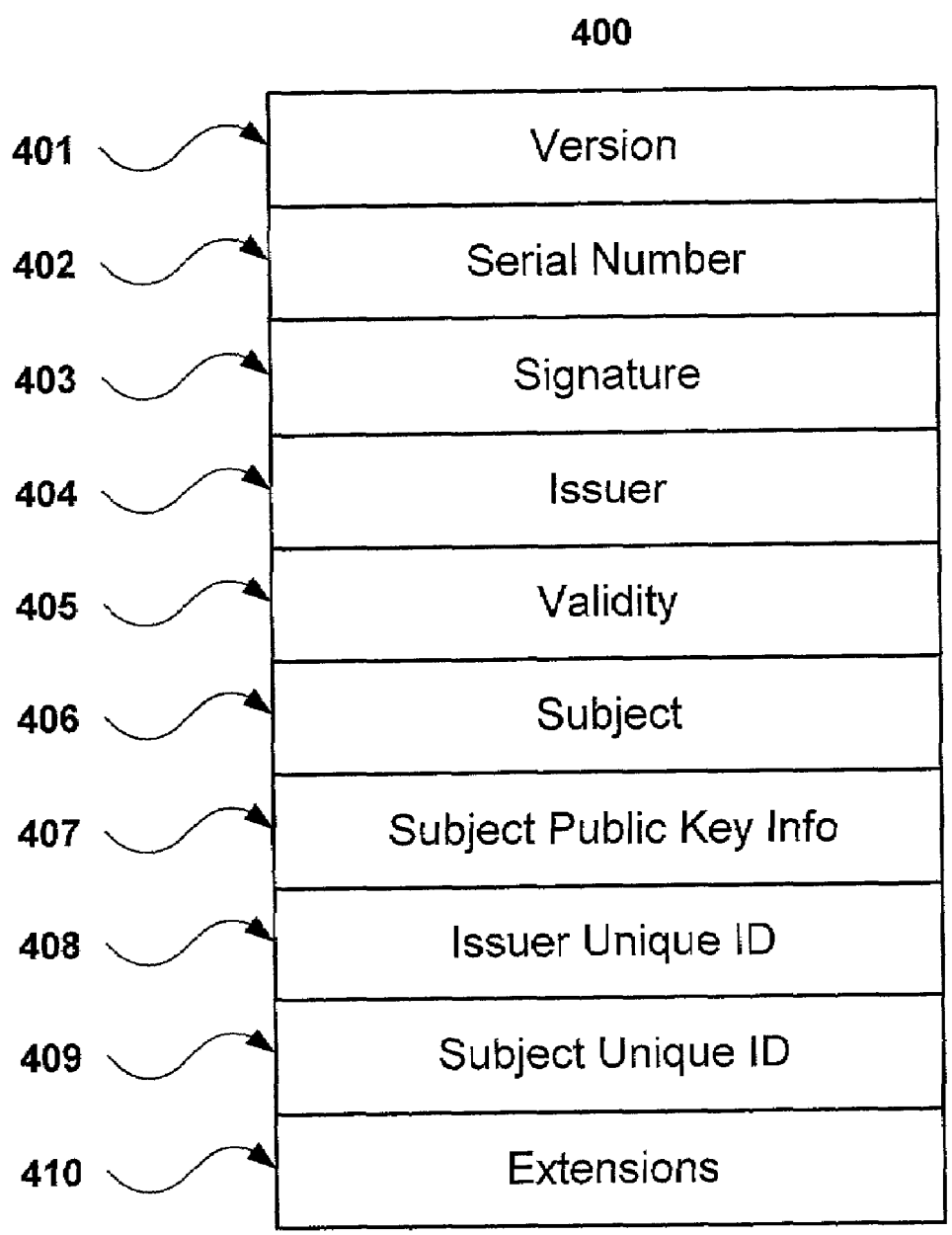
FIG. 4 is a block diagram of a digital certificate.

Referring now to FIG. 4, a block diagram of a digital certificate for use in accordance with the present invention is shown. The "issuer" 404 refers to the certificate authority generating the certificate, and who is guaranteeing the identity of the subject. The "subject" 406 is the owner of the certificate, and whose identity the issuer has verified. This identity is used to verify the originator of signed documents.

Key components of the certificate include the digital signature 403 of the certificate, signed by the issuer, the issuer 404 name along with the issuer unique ID 408, the public key of the subject 407, the subject name 406, and certificate extensions 410. Extensions 410 allow any issuing authority to define additional information within the standard certificate format, and are used as part of the present invention, described below.

The subject's certificate 400 is signed by the certificate authority (CA) using the certificate authority private key. The resulting certificate can be used, in conjunction with the CA certificate, to validate the contents of the certificate, including all fields, such as the subject name and subject public key. The CA certificate—widely available on the Internet—is used to retrieve the CA public key. Thus, it is the trust in the CA that validates the certificate 400 and subject public key, and therefore validates of the originator of a document signed by the certificate 400 owner. Digital certificates, signatures, and public/private keys are well known by one of ordinary skill in the art, and therefore will not be described in more detail herein.

Figure 5:
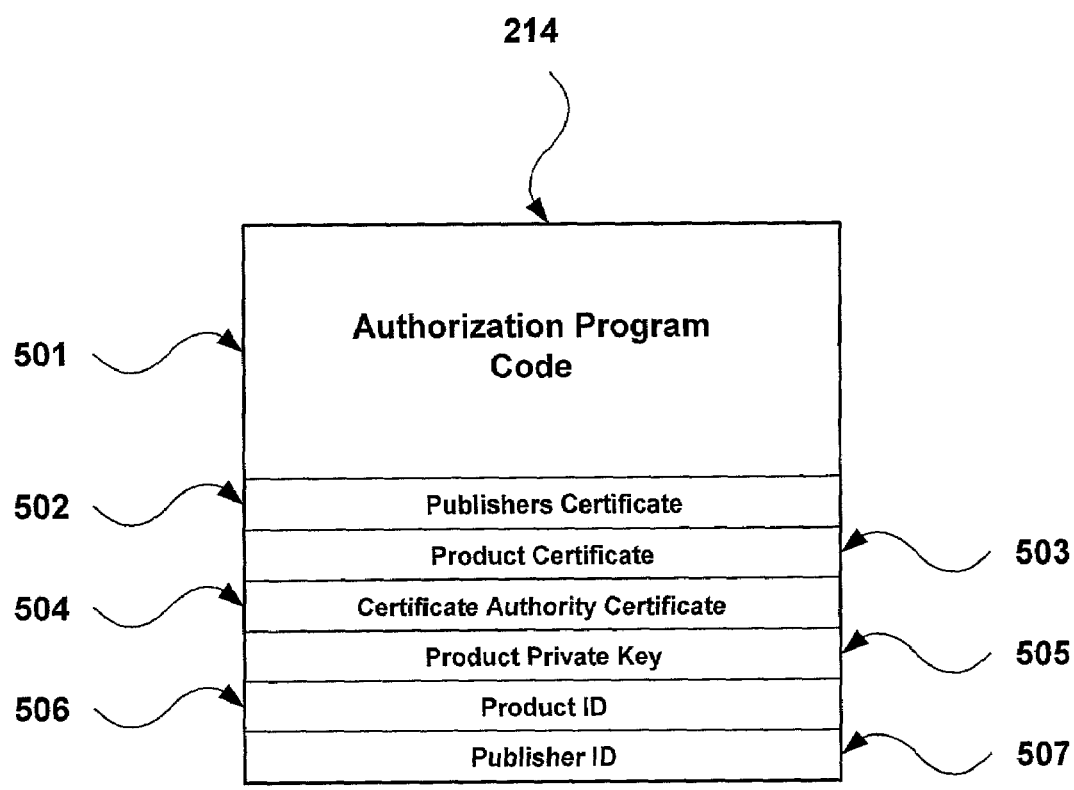
FIG. 5 is a block diagram of the authorization program showing the required information embedded within the program for use in generating the license request.

Referring now to FIG. 5, a block diagram of the authorization program 214 is shown, illustrating the required information embedded within the program for use in generating the license request according to a preferred embodiment of the present invention. Authorization program 214 includes the actual executable program code 501 for authorizing and controlling use of the software product 215. Embedded within the authorization program 214 are the following:

1. The software publisher's digital certificate 502, signed by the CA.
2. A software product digital certificate 503 associated with this software product 215 that contains the public key of the product keyset and is signed by the publisher's private key associated with the publisher's digital certificate 502.

3. The CA digital certificate 504.
4. The product private key 505 associated with the software product digital certificate 503,
5. The product ID code 506 assigned by the software publisher.
6. The publisher ID 507 assigned by the CA, also embedded in the extensions object 410 of the publisher's certificate 502.

This information is used to create the license request, described in conjunction with FIG. 6 and FIG. 7 below. The information is also used to validate a license, described in conjunction with FIG. 7 and FIG. 8 below.

Figure 6:
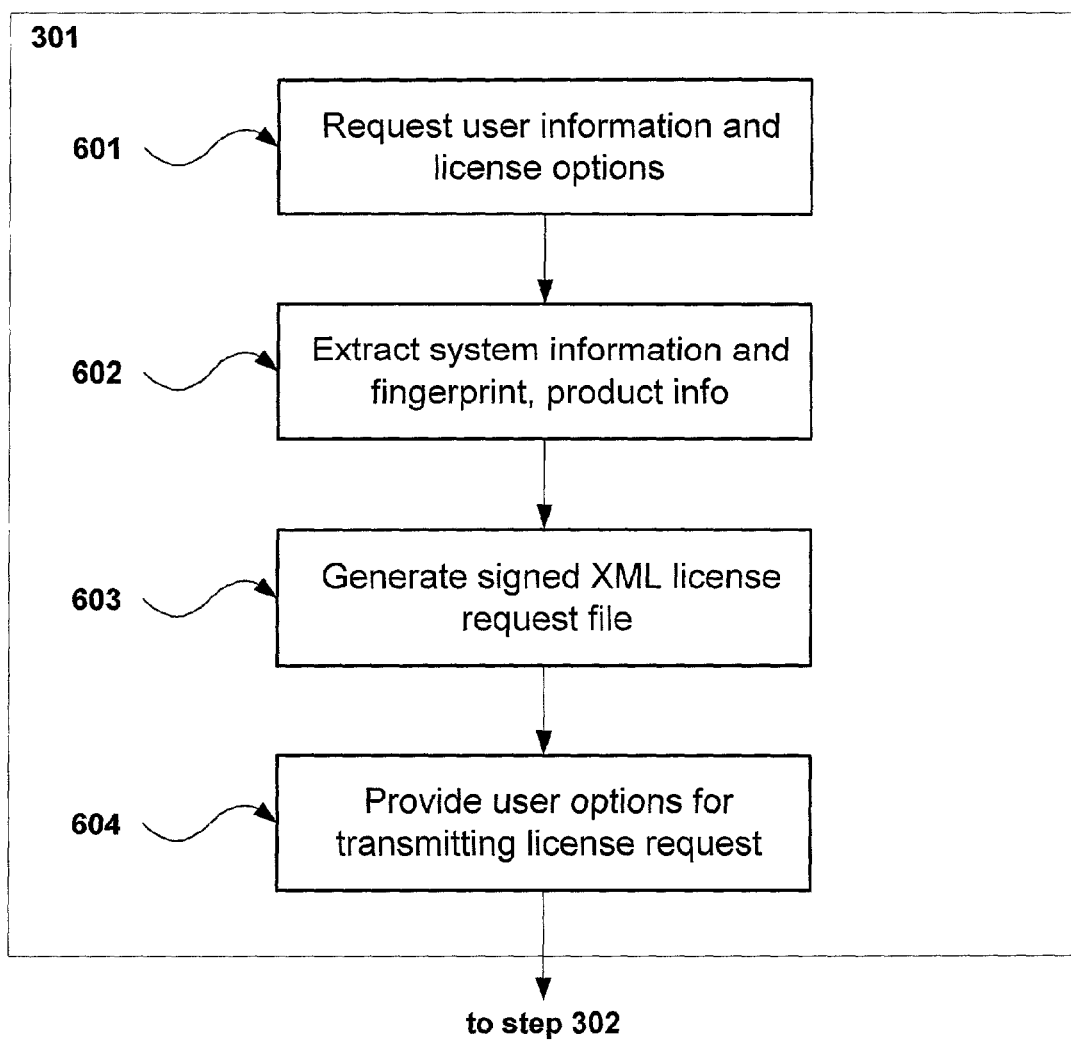
FIG. 6 is a flow diagram for license request generation by the authorization program.

Referring now to FIG. 6, a flow diagram for license request generation by the authorization program 214 is shown. This is the detailed diagram for step 301 in FIG. 3. In step 601, user information and license options are requested. Typically, this is done on the first invocation of a newly installed program, and includes one or more dialog boxes for the user to fill out, specifying information such as name, address, etc. In addition, if various options for use are supported, such as demo version, or basic vs. pro version, etc., the user will be asked to select the desired options. In some cases, a demo mode is assumed, often with a specific period of time, such as 30 days, and the user information gathering process is only started if the user decides to purchase the software, in order to turn on the features that are inhibited in demo mode, or to be able to use the software program after the demo period expires. It is at this stage where purchase information may be requested, such as credit card information. Alternatively, the user may be sent to a website to complete the financial transaction component of the licensing process. A key factor in the security of this process is to tie the financial transaction with the license request, rather than to the distribution of the software product itself.

A different embodiment is to sell the software through retail channels, and then require registration using the present invention. In this case, the financial transaction has already occurred. Typically, in this case, a serial number or other unique identification is required during the registration process, along with the user name, address, email, phone number, etc. However, in this case, this information cannot be verified through the credit card transaction.

Another approach to the license process is to fully license a demo version, but not associate it with a financial transaction. In this case, the user information is collected, and the license request/response process described herein is executed. The license response document will include license terms indicating limited use, defined by the software publisher. If the user decides to purchase the program at a later time, the request/response cycle is repeated—but this time, a financial transaction is involved, as described above. The new license response contains different license terms, and enables the product to function without the demo limitations. This process can extend to more powerful versions, such as a Pro version, for example. In this case, the user can move from the demo version to the standard version and later to the pro version, or could go directly from demo to pro version. The user could even decide to purchase the program without a demo, and go directly to either the standard or pro version. In all cases, the financial transaction is associated with the receipt of the request and the generation of the response for a functional license (a functional, non-demo license).

This association of financial transaction and functional license generation is key to preventing misuse of the license request/response system. If functional (non-demo) licenses could be requested without a financial transaction, it would be possible to generate free licenses by extracting the product private key from the authorization program 214. With the association, even if you do extract the private key, it still costs you money to purchase a license with this system.

Next, in step 602, information is extracted from the computer system, including configuration, such as processor type, amount of memory, operating system version, etc. In the preferred embodiment, a computer fingerprint is also captured. A fingerprint can be created in a number of different ways. One way is to capture unique information from the host machine, such as CPU serial number (if available), hard drive serial number, MAC address of the network card, etc. This information can then be digested using the message digest algorithm, resulting in a unique machine fingerprint. This fingerprint can be used to prevent the program from running on a machine other than the machine requesting the license. Also available is the product ID 506 and publisher ID 507, along with the software product name and software publisher name. Other information may also be included, depending on the requirements set by the software developer/publisher.

In step 603, in the preferred embodiment, a signed XML file is created to represent the license request. Of course any type of digitally signed document can be used for this purpose. The value of using the proposed signed XML standard is the support for various tools that exists for the standard that would not be available if a proprietary format was used. In addition to the information collected in steps 601 and 602, the digital product certificate 503 and product private key 505 are used in generating the XML license request. The contents of the license file are described below in detail in conjunction with FIG. 7 below. The license request is digitally signed using the product private key 505. The product certificate 503, that contains the product public key, is included within the XML document to enable verification at the receiving end.

Finally, in step 604, the user is given options for the transmission of the license request to the license server 102. In the preferred embodiment, if a network connection is detected, it is automatically used to connect with the license server 102 over the Internet. If no network connection is available, the user is presented with available options, such as using a dial-up modem, saving the file for sending with email at a later time, or writing the file to a floppy disk, optical disk, or compact flash card. It is even possible to select a paper printout for mailing, assuming the publisher was willing to accept the license request in that format, preferably for optical character recognition scanning into the back-end server 102. The license request is then generated in the selected format, and transmitted as appropriate, such that it arrives at the destination back-end server 102 in electronic form. The back-end server 102 is a key authority for the publisher, in that it has available to it the private publisher key associated with the publisher certificate 502.

Figure 7:
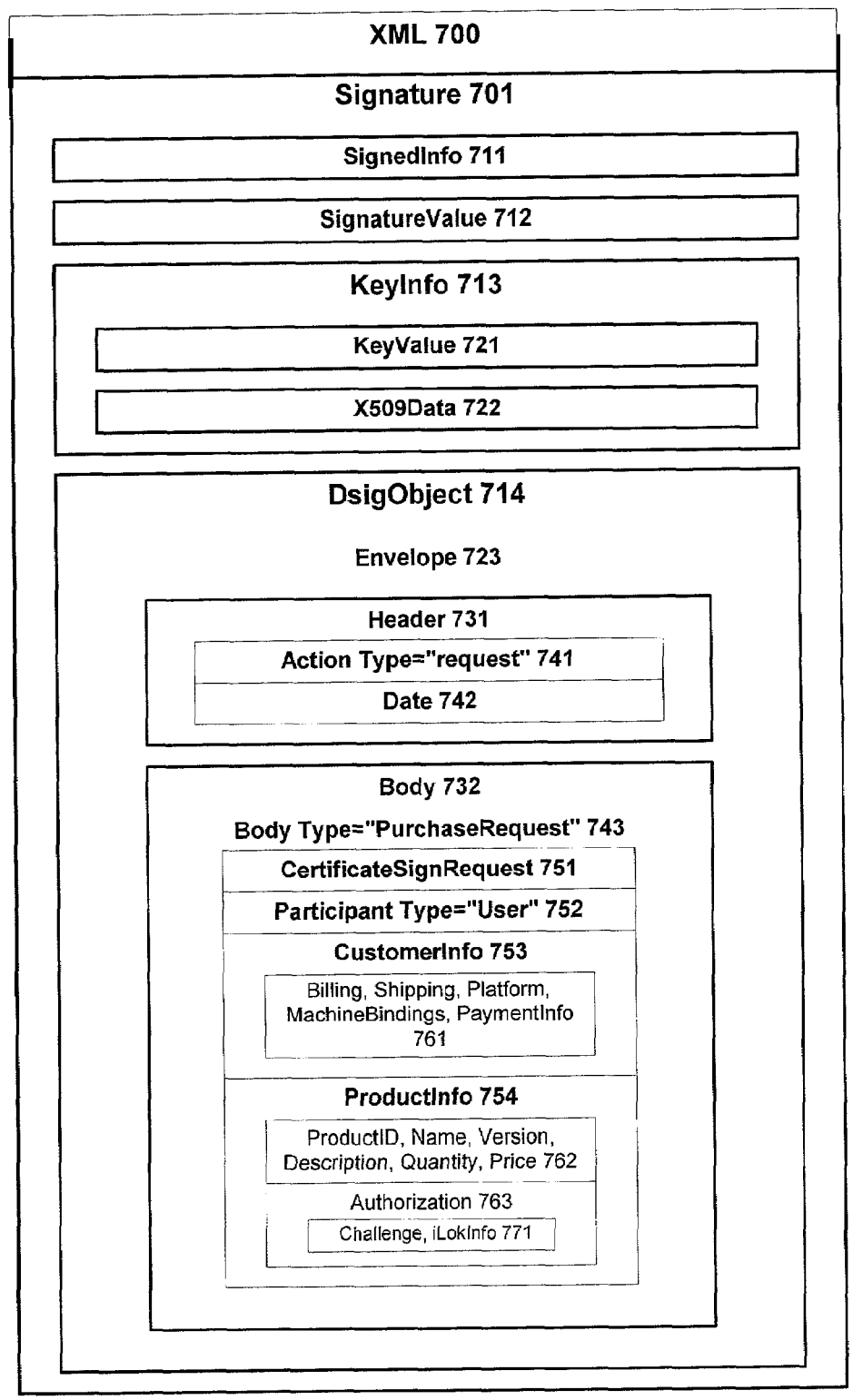
FIG. 7 is a block diagram of an XML license request generated by the authorization program.

Referring now to FIG. 7, a block diagram of the digitally signed XML license request 700 generated by the authorization program 214 in step 603 above is shown. The purpose of this diagram is to show the primary features relevant to the present invention, but not to show all the details within the proposed signed XML standard definition. The definition is widely available on the Internet, and is well known to those of ordinary skill in the art, and thus will not be included herein.

The XML object 700 comprises a single object, signature 701. Within the signature object 701 are four objects. It is the fourth object, DsigObject 714, that contains the unique message of the signed XML document, and for which the signature is applicable. Note that multiple DsigObjects can be included within the document, each with their own signatures.

The first object, SignedInfo 711, includes information about the signature used to sign the document, such as the algorithm used for canonicalization of DsigObject 714 prior to generating the message digest, the message digest algorithm used to generate the message digest of DsigObject 714, and the algorithm used to sign the document. Also included is the message digest itself, generated from the entire contents of DsigObject 714, including the tags bracketing the contents. The message digest is not encrypted. Rather, the message digests (more than one are possible) are signed, and the signature value is stored in the SignatureValue object 712. The signature is generated using the private product key 505.

Next is the KeyInfo object 713. KeyInfo 713 includes two other objects, KeyValue 721 and X509Data 722. KeyValue 721 specifies that this is an RSAKeyValue. The X509Data 722 is the public product certificate 503, signed using the publisher's private key associated with the publisher's certificate 502. This product certificate 503 can be validated by license server 102 using the publisher's certificate 502. The following steps accomplish this validation:
1. Using the publisher's public key, decrypt the message digest in the product certificate 503 signature.
2. Generate a message digest of the certificate.
3. Compare the decrypted message digest and the generated message digest. If they are the same, the contents of the certificate have been validated.

Using this same procedure, the publisher's certificate 502 can also be validated, but this time the CA certificate must be used, since it was the CA who signed the publisher's certificate 502. This sequence of validations ties the license request 700 back to the trusted certificate authority. The process of using and verifying digital certificates and digital signatures is well known by those of ordinary skill in the art, and will not be discussed in more detail herein.

The validated product certificate 503 can next be used to validate the message digest signature within the SignatureValue 712, by using the contained product public key, following steps similar to the three steps given above. Specifically:
1. Using the product public key from the product certificate 503, decrypt the message digest in the Signaturevalue 712 signature.
2. Generate a message digest of SignedInfo 711
3. Compare the decrypted message digest and the generated message digest. If they are the same, the contents of the message digest(s) in SignedInfo 711 have been validated.

Once this has been done, an additional step is required:
4. Generate a message digest of DsigObject 714 and compare it with the message digest in SignedInfo 711. If it is the same, the contents of DsigObject 714 have been verified, and a chain of known identities has been established back to the CA.

If more than one message digest exist, step 4 must be repeated for each object related to a separate message digest.

It is important to note that the product private key 505 is somewhat susceptible to discovery, since it is embedded in the authorizing program 214. If this key is compromised, it would allow generation of valid license requests. However, since license requests are processed in conjunction with a financial transaction involving payment for use of the product, it is not a serious issue, as described above. That is to say, if someone generates such a license request, they must pay for any license generated, and thus, have not achieved anything. Also, since they must submit payment typically via a charge card, their identity can be verified.

This technique of creating a public/private keyset and certificate for the purpose of generating license requests is used to protect the more important private keys related to the CA certificate 504 and the publisher certificate 502. These private keys are very securely protected and only available for use by the CA or the publisher.

Continuing with FIG. 7, the DsigObject 714 contains the actual license request information. This is contained within an envelope object 723. Enelope 723 contains a header object 731 and a body object 732. The header object 731 includes an action type "request" 741, and the date 742. As will be seen below, the action type can contain different values, such as "Response" for example.

The body 732 also includes a body type "PurchaseRequest" object 743. Within this object are various objects defining the license request particulars. First is the CertificateSignRequest 751. For a license request from an end user of the software product 215, this is empty. The next object ParticipantType 752 defines the participant type as User. Other participant types can be defined, such as Publisher, for example. However, for a license request from the end user of software product 215, this object defines the participant as user.

The next object, CustomerInfo 753, contains a number of objects 761 related to the customer, such as the billing address, shipping address, platform (computer type), machine bindings (fingerprint of the machine making the license request), and payment info (credit card info, for example).

The last object, ProductInfo 754, contains a number of objects 762 related to the software product 220 including the Product ID code 506, product name, product version, product description, quantity purchased, and price. Also within ProductInfo 754 is the authorization object 763. This object contains optional information such as a digital challenge, serial numbers, etc. Another object is the iLokInfo object 771. ILokInfo 771 contains information about a security "dongle" if associated with the use of the product. The iLokInfo object 771 can optionally contain a digital "challenge" to the server 102 that must be converted to an appropriate digital "response" in the license document. This digital response can be used, in effect, to authenticate the use of the software product once transferred and accepted by the dongle. In this case, it is possible to use only the dongle to authenticate the software product rather than the license response. Alternatively, both can be used for authentication.

Figure 8:
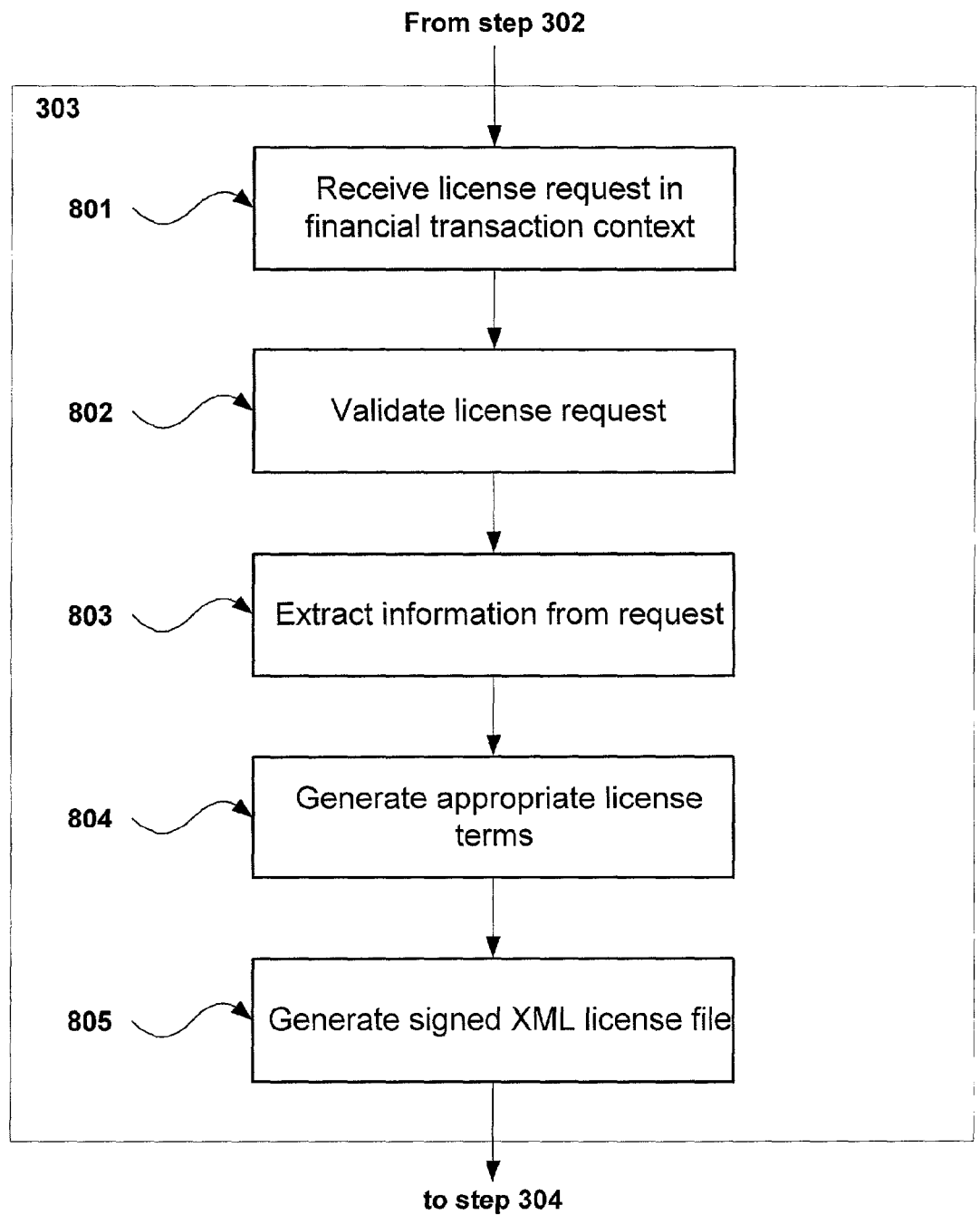
FIG. 8 is a flow diagram of the process for handling a license request by the license server, and generating a license.

Referring now to FIG. 8, a flow diagram of the process for handling a license request 700 by the license server 102, and generating a license is shown. This flow diagram is a detailed description of step 303 in FIG. 3, and begins in step 801 by receiving the license request 700 in conjunction with a financial transaction at the license server 102. Next, the license request 700 is validated in step 802 as described above. Specifically:
1. The product certificate 503 is validated using the publisher's certificate 502.
2. The publisher's certificate 502 is validated using the CA certificate.
3. The signature of the document contained in SignatureValue 712 is validated, using the product certificate 503.
4. The message digest of the DsigObject 714 is validated, using the specified message digest algorithm.

In step 803, information is extracted from the license request 700 to be reused in the license to be generated. Information extracted preferably includes CustomerInfo 753 and ProductInfo 754. Next, in step 804, appropriate license terms are created, based on the purchase transaction and information contained in CustomerInfo 753 and ProductInfo 754.

Finally, in step 804, a response document 900 is generated. This response document 900 is the actual software license document, and takes a similar form to the license request document 700. The differences between the response document 900 and the license request document 700 will be described in detail in conjunction with FIG. 9 below.

Figure 9:
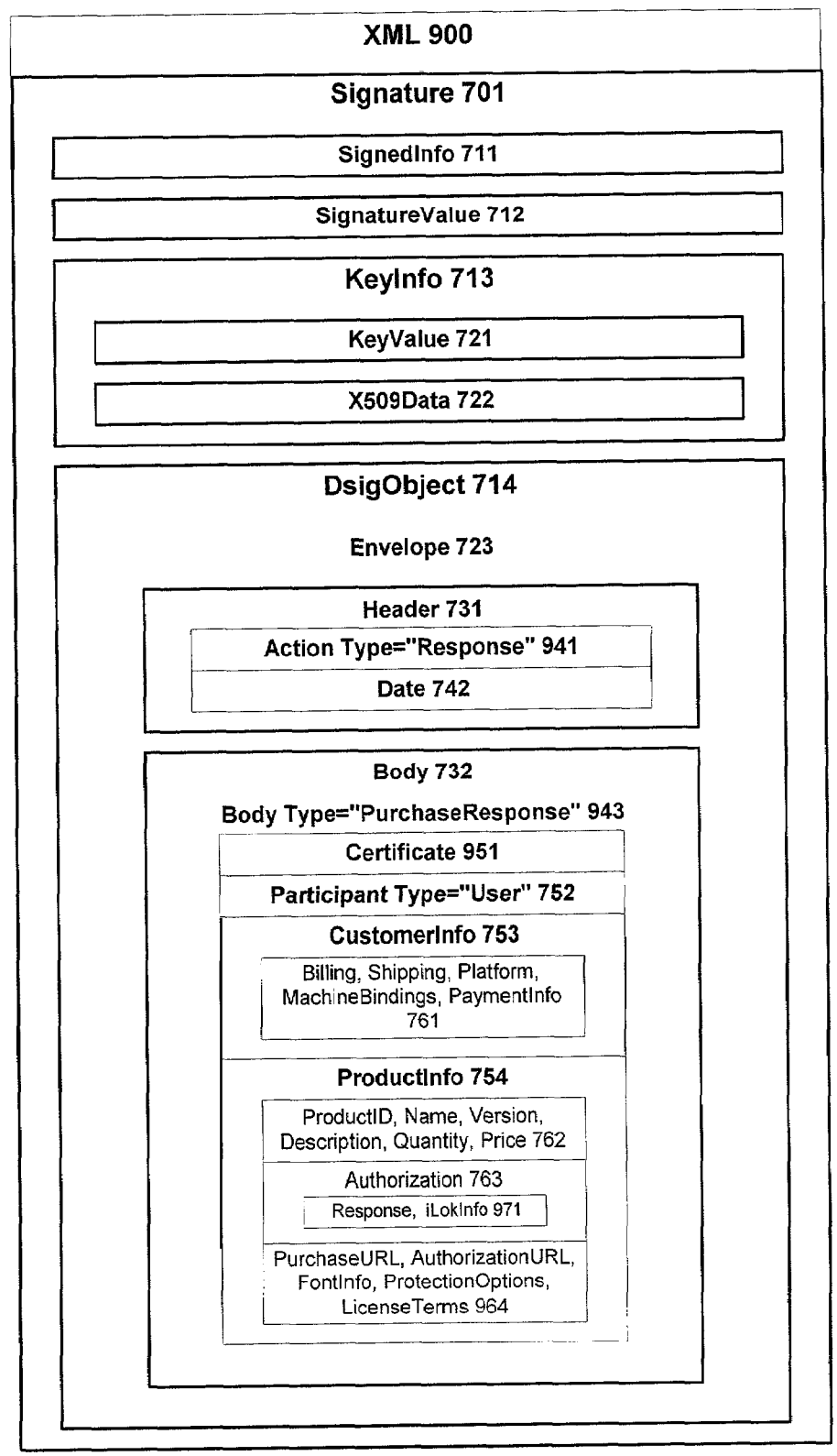
FIG. 9 is a block diagram of the XML license generated by the server.

Referring now to FIG. 9, a block diagram of the XML license response document generated by the server 102 is shown. This signed license response document 900 takes the same form as the license request 700, with changes in the DsigObject 714. The response document 900 is signed by the publisher's private key, associated with the publisher's certificate 502. This is possible because the server 102 is provided by a key authority for the publisher. As is well known by those skilled in the art, other arrangements are possible, such as the server 102 being supplied by the certificate authority, for example, or the server 102 being part of a multi-tiered solution involving distributors and dealers and their respective servers.

Other than the difference in the signer, and therefore the difference in the enclosed certificate in the X509Data 722, the changes between the request 700 and response documents 900 is concentrated in the DsigObject 714. The first difference of note is the new action type "Response" in the Action-Type 941 object. This object is similar to ActionType 741 in the request document 700.

The next difference is in the BodyType 943, defined as a "PurchaseResponse" rather than a "PurchaseRequest" as with BodyType 743 in the request 700.

The Certificate 951 object replaces the CertificateSignRequest 751 object, and may include a copy of both the CA certificate and the publisher's certificate, signed by the CA. This inclusion of certificates allows validation of the license without requiring additional information from an outside source. Normally, however, these certificates are also included within the authorization program 214, and therefore are optional in the license itself.

If a challenge was included in the Challenge or iLokInfo 771 object, the response is embedded in the Challenge or iLokInfo 971 as shown. Additional objects 964 are added, including various URL's for tracking the order process, FontInfo for controlling font usage (if the licensed software object is actually a font rather than a software program), ProtectionOptions, and LicenseTerms. LicenseTerms may include objects such as Features, DeveloperData, ExpirationDate, StartDate and other terms. Also included in this section is NodeLocked, that has a Boolean value. If true, the license restricts use of the software product 215 to the machine the license request was generated on.

The license response document 900 is a highly secure document that cannot be changed without invalidating the entire license. Prior to allowing the use of software product 215, the document 900 is validated in a similar manner to the process of validating the request document 700.

As described above, the response to a challenge from a dongle (iLok) device may be included within the response document 900, and may include within it not only authorization, but license terms or other authorization information. This may be used to complete the registration/authorization process for the software within the dongle device. In this case, one embodiment is to solely use the dongle device to authorize the use of the software product 220, including license terms. Alternatively, both the license and the dongle may be used to authorize the software product 220.

Figure 10:
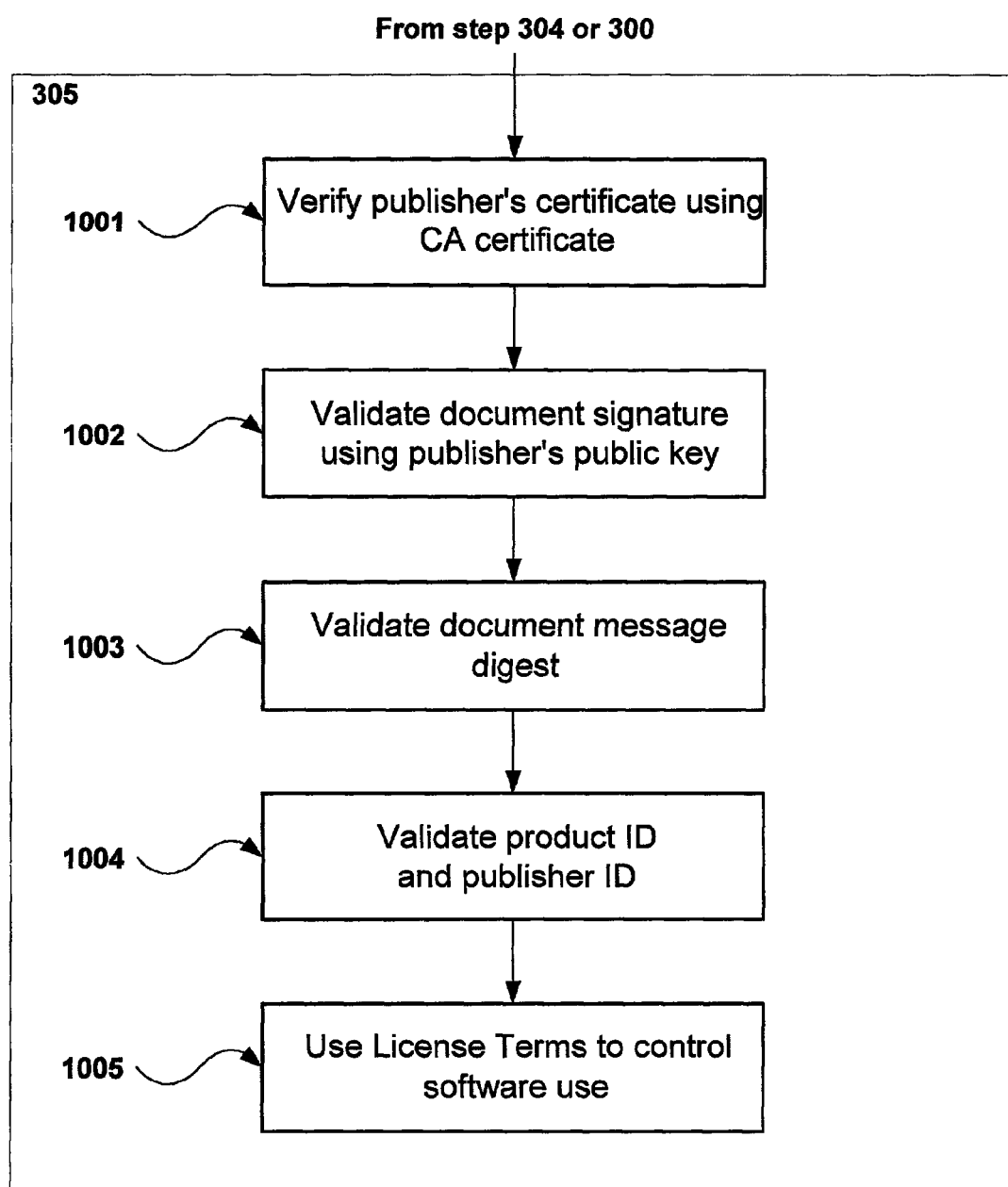
FIG. 10 is a flow diagram showing the license validation steps of the authorization program prior to authorizing use of the software program.

Referring now to FIG. 10, a flow diagram showing the license validation steps of the authorization program 214 prior to authorizing use of the software product 215 is shown. In step 1001, the publisher's certificate 502 is validated using the CA certificate 504. The self-signed CA certificate can also be validated in this step. In step 1002, the signature of the document contained in SignatureValue 712 is validated, using the validated publisher's certificate 502. At this point, we have validated the message digest, but not yet the DsgiObject 714. In step 1003, a message digest is generated from DsigObject 714, and compared with the value within SignedInfo 711 of document 900. If the values are the same, the message comprising DsigObject 714 has been validated. All valid licenses for any software product would validate through step 1003. In step 1004, values from within the validated DsigObject 714 are checked, including the publisher name and ID, and product name and ID. Note that one copy of the publisher ID 507 is included within the publisher certificate 502. A separate copy may be placed within DsigObject 714. The software product also contains this ID within the authorization program 214. This step ensures that a valid license exists for this product, not for some other product, and that the product is from the correct publisher.

Finally, in step 1005, the license terms contained in LicenseTerms 964 are used to control the use of the software product 215. Controlling the use of a software product from license terms is well known by those of ordinary skill in the art, and thus will not be described herein.

A process for delivery of a flexible and easy to use secure software license for controlling use of a software product has been described. The present invention has a very high security because of the complete chain of digital signatures all the way back to the certificate authority. This unbroken chain verifies the identity of all parties involved, through the identity checking process used by the certificate authority. Likewise, the identity of the person to which the license was issued can be identified through the associated financial transaction, typically by credit card. The license file—the response document 900—cannot be tampered with without detection, without access to the secret publisher's private key and the certificate authority's private key. Thus, the content of the response document 900 is secure, and the license terms contained within are safe from tampering. Of course this does not prevent a hacker from attacking the authorization program 214 or the software product 215 itself, with the goal of extracting the software product 215 for use without the authorization program 214. This invention does not address this avenue of attack.

Another avenue of attack, specifically for node-locked licenses that are only allowed to run on a single computer, is a means whereby the software is fooled into thinking that it is running on the computer for which the license was issued, even when this is not the case. This conceivably could be accomplished by creating a kernel-level routine that provides false system information when the request comes from the authorization program 214. This would require a very high level of skill, and also would require knowing or discovering how the machine fingerprints are created. If done "correctly," all other programs would receive the proper information from the operating system, while the authorization program 214 would receive false information. If this was successfully accomplished, the software product 220 could be distributed with a copy of a single license, along with the kernel routine. However, it is important to note that the license contains the name and financial identity of the original license buyer, and therefore the liability for the illegal copies can be traced, at least that far. This makes it important for legitimate licensees to not provide copies of their licenses to others, lest they be charged with illegal activity if their license is used as described.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into the computer system for execution. Accordingly, many modifications may be made by one of ordinary skill in the art without departing from the spirit and scope of the appended claims.

What is claimed is:

1. A method for the delivery of secure software license information to authorize use of a software product, the method comprising the steps of:
   (a) associating with a software publisher a private and public key pair, wherein the software publisher provides the software product and includes a software program and an authorization program within the software product;
   (b) associating a product private key and public key with the software product, wherein at least one of the product private and public keys is digitally signed by the publisher private key, and including the product private and public keys with the authorization program;
   (c) upon invocation of the software product on a computer,
      (i) generating by the authorization program a license request containing user and product information,
      (ii) digitally signing the license request with the product private key, and
      (iii) transferring the signed license request to a key authority,
   (d) in response to the key authority receiving the signed license request,
      (i) generating a license using data extracted from the license request and license terms,
      (ii) signing the license with the publisher private key, and
      (iii) transmitting the signed license to the authorizing program; and
   (e) validating the signed license using the publisher public key, and using the license terms to control the use of the software product.

2. The method of claim 1 further including the step of providing the publisher public key as a certificate.

3. The method of claim 2 further including the step of providing the product public key as a certificate.

4. The method of claim 1 further including the step of providing the license in a data exchange format.

5. The method of claim 4 further including the step of using XML as the data exchange format.

6. The method of claim 1 further including the step of using the license returned from the key authority to deliver additional key information to the computer.

7. The method of claim 1 wherein step (d) further includes the step validating the license request using digital certificates.

8. The method of claim 1 wherein step (e) further included the step of validating the license response using digital certificates.

9. The method of claim 1 wherein step (e) further included the step of validating the license using the product information in the license, including product ID and publisher ID.

10. The method of claim 9 further including the step of transferring license terms to a separate security device for controlling the use of the software product.

11. The method of claim 1 wherein step (e) further included the step of preventing use of the software product on a different computer than that used to generate the license request by using a machine fingerprint embedded in the license request.

12. A method for the delivery of secure software license information to authorize use of a software product, the method comprising the steps of:
   (a) associating with a software publisher a private and public key pair, wherein the software publisher provides the software product and includes a software program and an authorization program within the software product;
   (b) associating a product private key and public key with the software product, wherein at least one of the product private and public keys is digitally signed by the publisher private key, and including the product private and public keys with the authorization program;
   (c) upon invocation of the software product on a computer,
      (i) generating by the authorization program a license request containing user and product information,
      (ii) encrypting the license request with the product private key, and
      (iii) transferring the encrypted license request to a key authority;
   (d) in response to the key authority receiving the encrypted license request,
      (i) decrypting the license request with the product public key
      (ii) generating a license using data extracted from the license request and license terms,
      (iii) encrypting the license with the publisher private key, and
      (iv) transmitting the encrypted license to the authorizing program; and
   (e) decrypting the license using the publisher public key, and using the license terms to control the use of the software product.

13. The method of claim 12 wherein step (e) further includes the step of verifying the license using the product information, including the product ID and publisher ID.

14. The method of claim 13 further including the step of transferring the license terms to a separate security device for controlling the use of the software product.

15. The method of claim 12 wherein step (e) further includes the step of preventing use of the software product on a different computer than that used to generate the license request by using a machine fingerprint embedded in the license request.

16. A method for the delivery of secure software license information to authorize use of a software product, the method comprising the steps of:
   (a) associating with the software product to be authorized an authorization program and a set of certificates, including a publisher certificate and a product certificate, wherein each certificate contains a public key and is associated with a private key of a public/private key pair, wherein the product certificate is signed by the private key associated with the publisher certificate;
   (b) upon invocation of the software product on a computer, generating by the authorization program a formatted license request containing user and product information, signed using the private key associated with the product certificate;

(c) transmitting the license request to a key authority in conjunction with a financial transaction;

(d) generating by the key authority a formatted license that includes license terms, and user and product information extracted from the license request, wherein the license is signed with the publisher private key associated with the publisher certificate;

(e) transmitting the signed license to the authorizing program; and (f) validating by the authorization program the license using the publisher and certificate authority certificates and the user and product information contained within the license document, whereby the validation using the publisher and certificate authority certificates establish a trusted link back to the certificate authority; and (g) using the license terms to control the use of the software product on the computer.

17. The method of claim 16 further including the step of formatting the license request and license documents using the proposed signed XML standard definition.

18. The method of claim 16 further including the step of signing the product certificate using the publisher's private key, and signing the publisher certificate using the certificate authority's private key, thus establishing a trusted link from the product certificate back to the certificate authority.

19. The method of claim 16 further including the step of signing the license request using the product private key, and including within the license request the product certificate.

20. The method of claim 16 further including the step of including financial transaction information within the license request.

21. The method of claim 20 further including the step of including financial transaction information within the license response.

22. The method of claim 16 wherein step (g) further includes the step of transferring the license terms to a separate security device for controlling the use of the software product.

23. The method of claim 16 wherein step (g) further includes the step of preventing use of the software product on a different computer than that used to generate the license request by using a machine fingerprint embedded in the license request.

24. A method for generating and validating a software license for a software product published by a software publisher for the purpose of authorizing use of the software product, the method comprising the steps of:

(a) receiving, by the software publisher, a publisher certificate digitally signed by a certificate authority, wherein the publisher certificate includes a publisher ID;

(b) embedding the publisher ID within the software product to be authorized;

(c) in response to receiving a license request to authorize use of the software product, signing by the software publisher the license for the software product using a private key associated with the publisher certificate, wherein the publisher certificate is included as part of the signature, such that the license for the software product can be validated by, i. validating the publisher certificate using a certificate authority certificate, ii. validating the signature and contents of the license based on the validated publisher certificate, and iii. validating the software publisher who signed the license by comparing the publisher ID in the publisher certificate contained within the license with the publisher ID in the software product; and (d) using the validated license contents to control the use of the software product.

25. The method of claim 24 further including the step of embedding a product ID within the software product and within the software license.

26. The method of claim 25 further including the step of validating the license by comparing the product ID stored in the license with the product ID stored within the software product.

* * * * *